United States Patent [19]

Villella et al.

[11] Patent Number: 5,547,241
[45] Date of Patent: Aug. 20, 1996

[54] SHOCK-CORDED ARTICULATED DOOR

[75] Inventors: Paul A. Villella, St. Paul, Minn.; Jerry T. Teigen, New Richmond, Wis.

[73] Assignee: Dorso Trailer Sales Inc., St. Paul, Minn.

[21] Appl. No.: 406,649

[22] Filed: Mar. 20, 1995

Related U.S. Application Data

[63] Continuation of Ser. No. 84,740, Jun. 29, 1993, abandoned, which is a continuation-in-part of Ser. No. 877,874, May 4, 1992, Pat. No. 5,238,283, which is a continuation of Ser. No. 675,657, Mar. 27, 1991, Pat. No. 5,165,746.

[51] Int. Cl.⁶ .................. B60P 3/00; B60J 5/06
[52] U.S. Cl. ............ 296/24.1; 296/155; 160/201; 160/235
[58] Field of Search ............... 160/84.01, 84.03, 160/84.06, 201, 235; 296/24.1, 98, 100, 155

[56] References Cited

U.S. PATENT DOCUMENTS

| | | | |
|---|---|---|---|
| 1,936,300 | 11/1933 | Guss | 160/133 |
| 2,134,983 | 11/1938 | Nottingham | 160/201 |
| 2,951,533 | 9/1960 | Lucas et al. | 160/40 |
| 3,056,451 | 10/1962 | Federline et al. | 160/201 |
| 3,078,917 | 2/1963 | Recchione | 160/120 |
| 3,129,752 | 4/1964 | Whiting | 160/201 |
| 3,135,544 | 6/1964 | Mickey et al. | 296/24.1 |
| 3,148,724 | 9/1964 | Chieger et al. | 160/40 |
| 3,424,222 | 1/1969 | Stoner et al. | 160/40 |
| 3,850,465 | 11/1974 | Hill et al. | 292/231 |
| 3,894,571 | 7/1975 | Hinchliff | 160/201 |
| 3,980,123 | 9/1976 | Vago | 160/201 |
| 4,114,945 | 9/1978 | Lutz | 16/93 R |
| 4,219,067 | 8/1980 | Hurst | 160/133 |
| 4,343,340 | 8/1982 | Paule | 160/232 |
| 4,601,953 | 7/1986 | Haffer | 428/457 |
| 4,611,848 | 9/1986 | Romano | 296/98 |
| 4,747,441 | 5/1988 | Apolzer et al. | 160/84.1 |
| 4,776,379 | 10/1988 | Kraeutler | 160/84.1 E |
| 4,785,494 | 11/1988 | Adamski | 16/95 R |
| 4,786,099 | 11/1988 | Mount | 296/98 |
| 4,800,619 | 1/1989 | Hudak | 16/95 R |
| 4,889,381 | 12/1989 | Tamblyn et al. | 296/98 |
| 4,924,932 | 5/1990 | Esnault | 160/201 |
| 4,972,894 | 11/1990 | Machill | 160/235 |

*Primary Examiner*—Andrew C. Pike
*Attorney, Agent, or Firm*—Kinney & Lange, PA

[57] ABSTRACT

An articulated door and door guiding track covers storage bays of a beverage body. The articulated door is formed by engaging a plurality of polymeric panel sections into a sequence such that each panel section can be positioned at varying angles with respect to an adjacent engaged panel section. Elastic shock cord runs from the bottom panel section to the top panel section of each articulated door. The shock cord prevents adjacent panel sections from moving laterally with respect to one another and holds the flat outer surface of each panel section flush with the flat outer surfaces of adjacent panel sections. The articulated door is guided between an open position and a closed position by a door guiding track comprised of a left channel facing a right channel across a door opening. The door is slidably positioned in the door guiding track by having a left end of each panel section extending into the left channel and a right end of each panel section extending into the right channel.

24 Claims, 8 Drawing Sheets

SHOCK-CORDED ARTICULATED DOOR

CROSS REFERENCE TO RELATED APPLICATION

The present application is a continuation of application Ser. No. 08/084,740, filed Jun. 29, 1993 and abandoned Mar. 20, 1995, which in turn was a continuation-in-part of application Ser. No. 07/877,874, filed May 4, 1992 and issued Aug. 24, 1993 as U.S. Pat. No. 5,238,283. The continuation-in-part application was a continuation of application Ser. No. 07/675,657, filed Mar. 27, 1991 and issued Nov. 24, 1992 as U.S. Pat. No. 5,165,746.

BACKGROUND OF THE INVENTION

The present invention relates to articulated doors. More specifically, the present invention relates to an articulated door formed from a sequence of engagable polymeric panel sections and held together by elastic shock cord.

Beverage trailers and trucks employing beverage bodies have long been used to deliver beverages to various sorts of retailers. Articulated doors are typically used on both sides of a beverage body to permit access to individual storage bays where the beverages are stored. Under normal use, these doors are opened many times during the day as the driver delivers beverages to retailers along his route. While a general purpose delivery truck may use one roll-up door at the rear of the truck, a typical beverage body may use ten or more doors. Therefore, any disadvantage associated with a particular door design is multiplied many times when that design is employed in a beverage body.

Beverage bodies have typically employed articulated doors that are formed from a sequence of solid aluminum panel sections. These panel sections are formed with interlockable edges. Usually an aluminum panel section will have a first interlockable edge with an attached cylindrical structure and a second interlockable edge opposite the first edge with an attached cylindrical structure having a radius larger than the radius of the cylindrical structure attached to the first edge. The smaller cylindrical structure of a panel section is placed within the larger cylindrical structure of an adjacent panel section, thereby forming a joint that allows the two adjacent panel sections to be positioned at varying angles with respect to each other. The smaller cylindrical structure also includes a hollow center in which rollers are inserted. Therefore, every joint typically has a corresponding pair of rollers.

To guide an articulated aluminum door between an open position and a closed position, a door guiding track is required. A typical door guiding track is comprised of a pair of channels, with each channel having a pair of channel members facing each other across a gap in which the rollers are inserted. These channel members also may include track liners, often formed of stainless steel, to absorb vibrational energy and to reduce friction between the rollers and the channel members.

Several problems arise from using this type of articulated aluminum door in a beverage body. When doors of this type are new, they typically work fine. However, as the beverage body is used, the door frame can be deformed by backing into loading docks and driving over rough roads and curbs. When the door frame is deformed, the door guiding track becomes out of square and the door will either jam or become very difficult to raise and lower.

As the beverage body is transported over roads with the articulated doors closed, the doors vibrate in their tracks. This vibrational energy is absorbed by the rollers and channel members as they vibrate against each other. This forms flat spots on the rollers and indentations in the channel members at the points where the rollers contact the channel members. As these indentations grow in size, the space surrounding the rollers increases, allowing the vibrations to increase in intensity and thereby increasing the rate at which the rollers and channel members deteriorate. These indentations also contribute to the door becoming more difficult to raise and lower.

As a door becomes more difficult to raise and lower, the rollers and channel members are lubricated. The lubrication eventually picks up dust and dirt, which further accelerates the deterioration of the rollers and door guiding track. A delivery person will progressively exert more force to open and close the door as this deterioration cycle continues. Eventually a point will be reached when the delivery person will no longer be able to move the door. At this point the beverage body is brought back to the warehouse where typically a forklift is used to unjam the door, which usually destroys the door.

Another problem that is exacerbated by the indentations is a buckling, or rippling effect apparent when the door is viewed in the closed position. Even when an articulated aluminum door is new, the diameter of the rollers is smaller than the width of the door guiding track that supports the rollers. This causes the door to collapse slightly into the door guiding track when the door is in the closed position, with individual panel sections tending to alternate. One panel section will lean one way as its corresponding roller is pushed to one side of the channel member and the next panel section in the sequence will lean the other way as its corresponding roller is pushed to the other side of the channel member. As the indentations grow in size, this rippling, or buckling effect becomes more pronounced. This creates an aesthetically unpleasing effect, especially when an articulated aluminum door has been painted with a beverage company's logo.

An articulated door and door guiding track that is constructed from self-lubricating materials and does not employ rollers would be resistant to deterioration and track alignment problems and would therefore be very desirable. In addition, such a door would be less likely to suffer from buckling and rippling.

Because aluminum is not a resilient material, collisions with an articulated aluminum door usually result in a partial or complete destruction of the door. This can happen in a warehouse, where forklifts maneuver around and load beverage bodies, in an on-street accident, or from within the beverage body itself if the beverages contained therein should tip over. While the door can sometimes be repaired by replacing the impacted panel section, often adjacent panels will be deformed from the force transmitted through the interlocking edges.

When using beverage bodies in cold climates, the storage bays must be heated to prevent the beverages from freezing. Typically this is accomplished by circulating heated engine coolant from the tractor through the floor of the beverage body. Because aluminum is a highly thermoconductive material, a layer of insulation must be added to the inner surface of an articulated aluminum door to retain the heat in the beverage body. This adds significant expense, complexity and weight to articulated aluminum doors used in beverage bodies.

Another problem associated with the use of beverage bodies in cold climates results from the salt and sand that is applied to road surfaces to melt ice and improve traction. The salt and sand work their way into the joints that connect adjacent panel sections, where they corrode and wear down the aluminum surfaces that form the joint. While the door can be steam cleaned, the joint has usually been damaged by the time this is done. Eventually the joint will lock up and the affected panel sections must be replaced.

Because of the weight of an articulated aluminum door, a counterbalance device is typically used to assist the delivery person in opening and closing the door. This device is usually located above the storage bay. The counterbalance adds weight and complexity to the beverage body and decreases the available space left to transport beverages.

An articulated door comprised of panel sections formed from a lightweight, high insulation, wear resistant, corrosion resistant and resilient material would be very desirable.

SUMMARY OF INVENTION

The present invention is an articulated door. The articulated door is formed from a plurality of polymeric panel sections that are engaged in a sequence of panel sections such that each panel section can be positioned at varying angles with respect to an adjacent engaged panel section.

The articulated door of the present invention is provided with at least one segment of elastic shock cord that runs through a plurality of panel sections. The elastic cord holds the door together by preventing the panel sections from sliding apart, and minimizes buckling and rippling, thereby providing the door with a more aesthetically pleasing appearance than doors of the prior art.

DETAILED DESCRIPTION OF THE PREFERRED EMBODIMENTS

The present invention is an articulated door formed from a plurality of panel sections. The articulated door of the present invention is provided with a segment shock cord that runs through the panel sections. In one application, the door is used in a beverage body.

Figure 1:
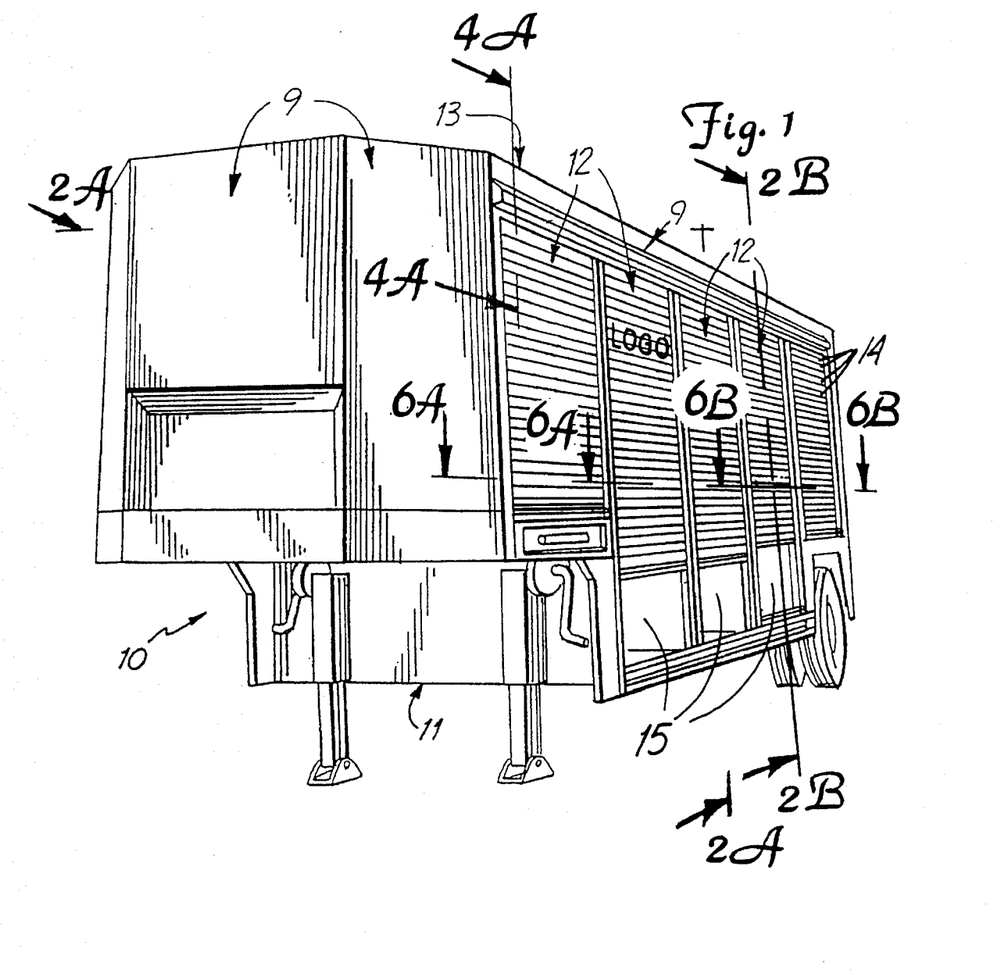
FIG. 1 is a perspective view of a beverage body having articulated doors, in accordance with the present invention.

FIG. 1 is a perspective view of beverage body 10. Beverage body 10 has floor 11, roof 13, generally vertical walls 9 intermediate the floor and the roof, and a plurality of door openings in which articulated doors 12 are positioned. Beverage body 10 has an interior that is divided into individual beverage storage bays 15, which are accessible when articulated doors 12 are open. Articulated doors 12 are formed by engaging polymeric panel sections 14 into a sequence. A typical door of this type is 87 inches tall and 54 inches wide.

Figure 2A:
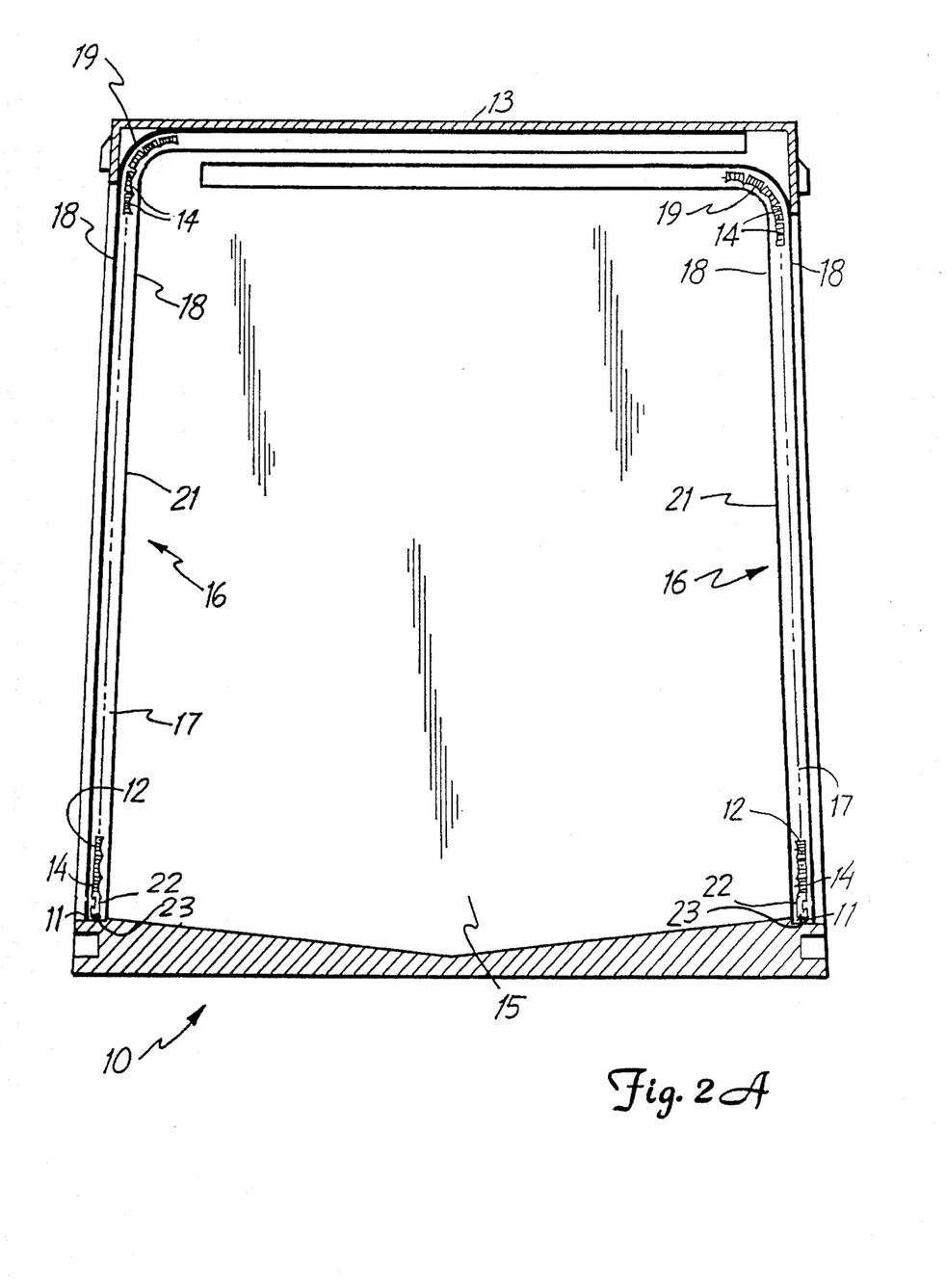
FIG. 2A is a transverse sectional view taken along line 2A—2A of FIG. 1 showing two articulated doors installed in a beverage body.

FIG. 2A is a transverse sectional view taken along line 2A—2A of FIG. 1 showing two articulated doors 12 installed in beverage body 10. Articulated doors 12 provide access to beverage storage bay 15 and are formed by engaging panel sections 14 into a sequence (this view does not show every panel section 14 required to form articulated door 12). A bottom panel section 22, located adjacent to floor 11 of beverage body 10 when articulated door 12 is in the closed position, is formed from aluminum and contains seal 23.

Articulated doors 12 are supported and guided by door guiding track 16. Each door guiding track 16 is comprised of a pair of channels 21, which face each other across the door opening. In this figure, only one channel 21 of each door guiding track 16 is visible. Each channel 21 includes channel members 18, which face each other across gap space 17, and curved segment 19, which is provided to guide articulated door 12 above beverage storage bay 15 and along roof 13 when door 12 is moved to the opened position.

Figure 2B:
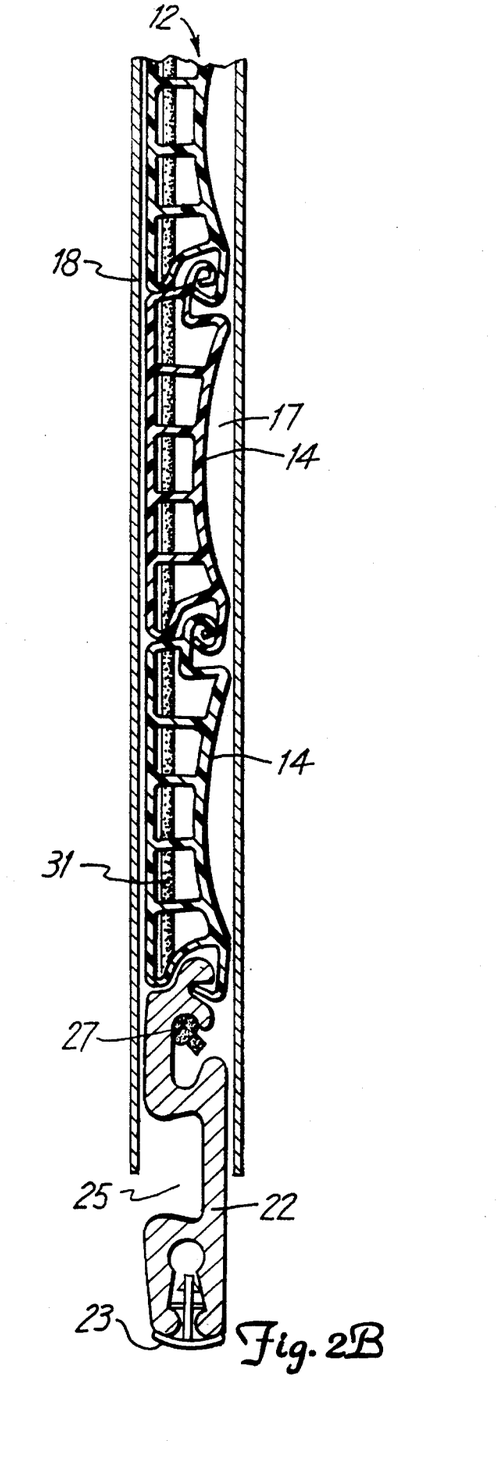
FIG. 2B is an enlarged sectional view taken along line 2B—2B in FIG. 1 showing a section of an articulated door of FIG. 2A.

FIG. 2B is an enlarged view of the bottom portion of left articulated door 12 of FIG. 2A. Running through each panel section 14 of door 12 are two segments of elastic shock cord 31 (only one segment of shock cord 31 is visible in FIG. 2B). Also shown in FIG. 2B is bottom aluminum panel section 22. Shock cord 31 is terminated at a hole in aluminum panel section 22 by knot 27. Knot 27 prevents cord 31 from retracting into door 12 and applies a force to aluminum panel section 22 that helps hold door 12 together. Aluminum panel section 22 includes handle 25, which is used for raising and lowering door 12. Aluminum panel section 22 also holds seal 23, which contacts floor 11 of FIG. 1 when door 12 is in the closed position.

Figure 3:
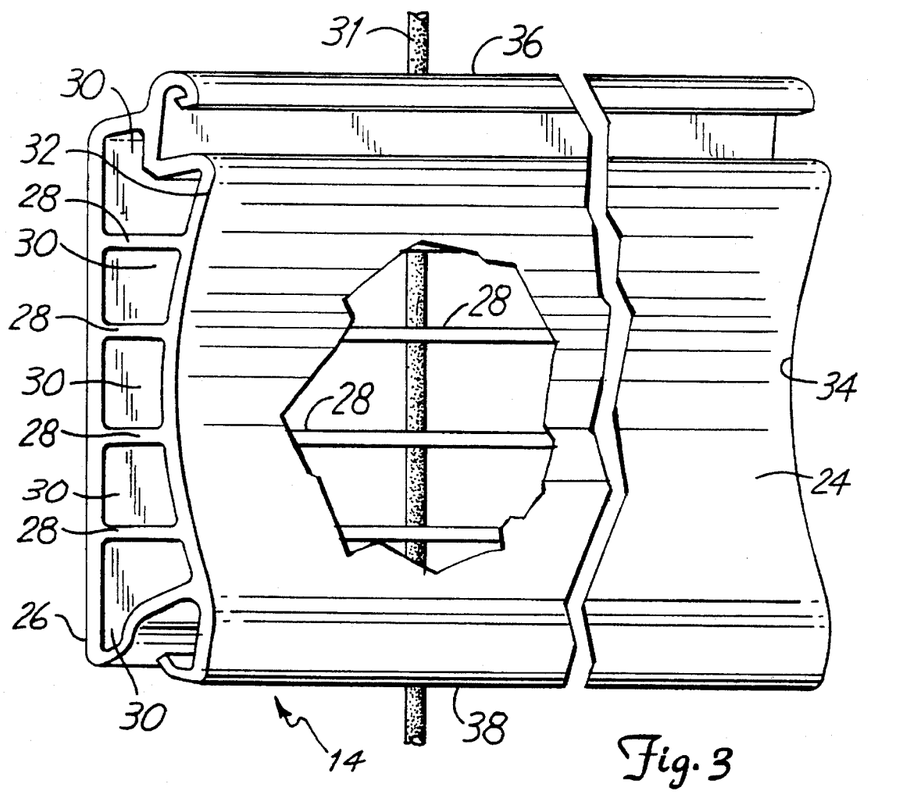
FIG. 3 is a perspective view of a panel section, a plurality of which engaged in a sequence forms the articulated door of FIG. 1.

FIG. 3 is a perspective view of polymeric panel section 14. When a plurality of panel sections 14 are engaged in a sequence, they form articulated door 12 of FIG. 1. Panel section 14 has curved inner surface 24 and flat outer surface 26. Curved inner surface 24 has a preferred radius of 2.099 inches. This facilitates the movement of articulated door 12 through the curved section 19 of door guiding track 16 of FIG. 2A. Flat outer surface 26 is provided so that articulated door 12 can be easily painted with a beverage company's logo using a process such as silk-screening. Curved inner surface 24 and flat outer surface 26 are connected to each other by a plurality of parallel partitions 28. Plurality of parallel partitions 28 divides a space between flat outer surface 26 and curved inner surface 24 into a plurality of parallel compartments 30. This increases the strength of each panel section 14 while decreasing the weight of each panel section. Parallel compartments 30 also improve the insulating properties of the panel sections. An articulated door formed from a plurality of panel sections 14 will have an insulation value approximately twice that of an insulated aluminum door of the prior art.

In FIG. 3, part of curved inner surface 24 is cut away to reveal elastic shock cord 31 and parallel partitions 28. Each partition 28 has a hole through which shock cord 28 passes (also note shock cord 31 in FIGS. 2B and 4). Shock cord 31 prevents adjacent panel sections from moving laterally with respect to one another, thereby holding the door together. Cord 31 also pulls adjacent panel sections towards one another, which minimizes buckling and rippling when door 12 is in the closed position.

Panel section 14 has right end 32 and left end 34 (named with respect to viewing a panel section 14 in an articulated door 12 from an exterior of beverage body 10 of FIG. 1). Right end 32 and left end 34 expose the plurality of parallel compartments 30. Panel section 14 also includes top hook edge 36 and bottom receptive edge 38, which engage with adjoining panel sections 14 to form articulated door 12 of FIG. 1. Ideally, a distance between top hook edge 36 and bottom receptive edge 38, i.e., the height of panel section 14, is as large as possible. As this distance becomes larger, fewer panel sections 14 are required to form articulated door 12, thereby decreasing the cost of the door. However, as the height of the panel sections increases, so must the radius of curved section 19 of door guiding track 16 of FIG. 2A. Therefore, the preferred height of panel section 14 is 2.430 inches to facilitate an articulated door 12 formed from an acceptable number of panel sections 14, while maintaining an acceptable radius for curved section 19 of door guiding track 16.

Panel section 14 is formed by an extrusion process using a material that is a polymer blend of polyphenylene oxide and high impact polystyrene with triarylphosphate esters added to retard fire. Different variants of the polymer blend can be used based on the climate where the articulated door will be used. After the panel sections are formed, holes are drilled in the panel sections to accommodate shock cord 31. Compared to aluminum, the polymer blend used in the present invention has a high insulation value and is lightweight, resilient, self-lubricating, wear resistant, and corrosion resistant. Parallel partitions 28, curved inner surface 24, flat outer surface 26, top hook edge 36, bottom receptive edge 38, and other extruded walls are formed with a thickness of 0.05 inches.

Figure 4:
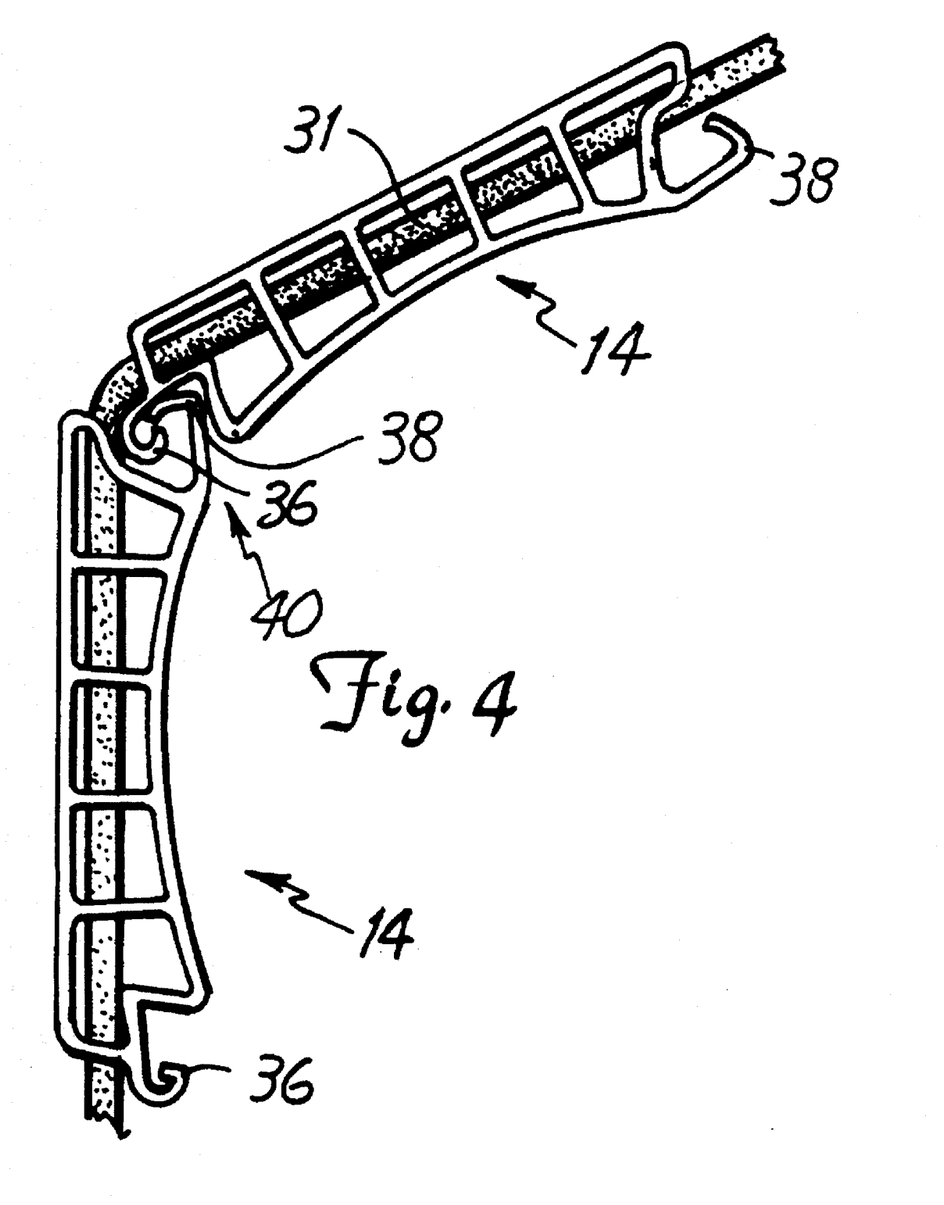
FIG. 4 shows a pair of adjacent engaged panel sections positioned at an angle with respect to each other.

FIG. 4 is a view of two of the adjacent panel sections 14 of FIG. 2B positioned at an angle with respect to each other. Two adjacent panel sections 14 would be positioned in such a way as they move through curved section 19 of door guiding track 16 of FIG. 2A. As adjacent panel sections move through curved section 19, shock cord 31 is stretched around top hook edge 36. Shock cord 31 supplies forces to the panel sections 14, which tend to move the panel sections into alignment with each other. Accordingly, when a door 12 of the present invention is in the closed position, shock cord 31 pulls the door together and ensures that all the flat outer surfaces of each panel section 14 are flush with each other, thereby eliminating the buckling and rippling effects found is aluminum doors of the prior art. This is especially important when a door 12 is provided with a beverage company's logo, because buckling and rippling degrade the appearance of the logo.

Figure 5A:
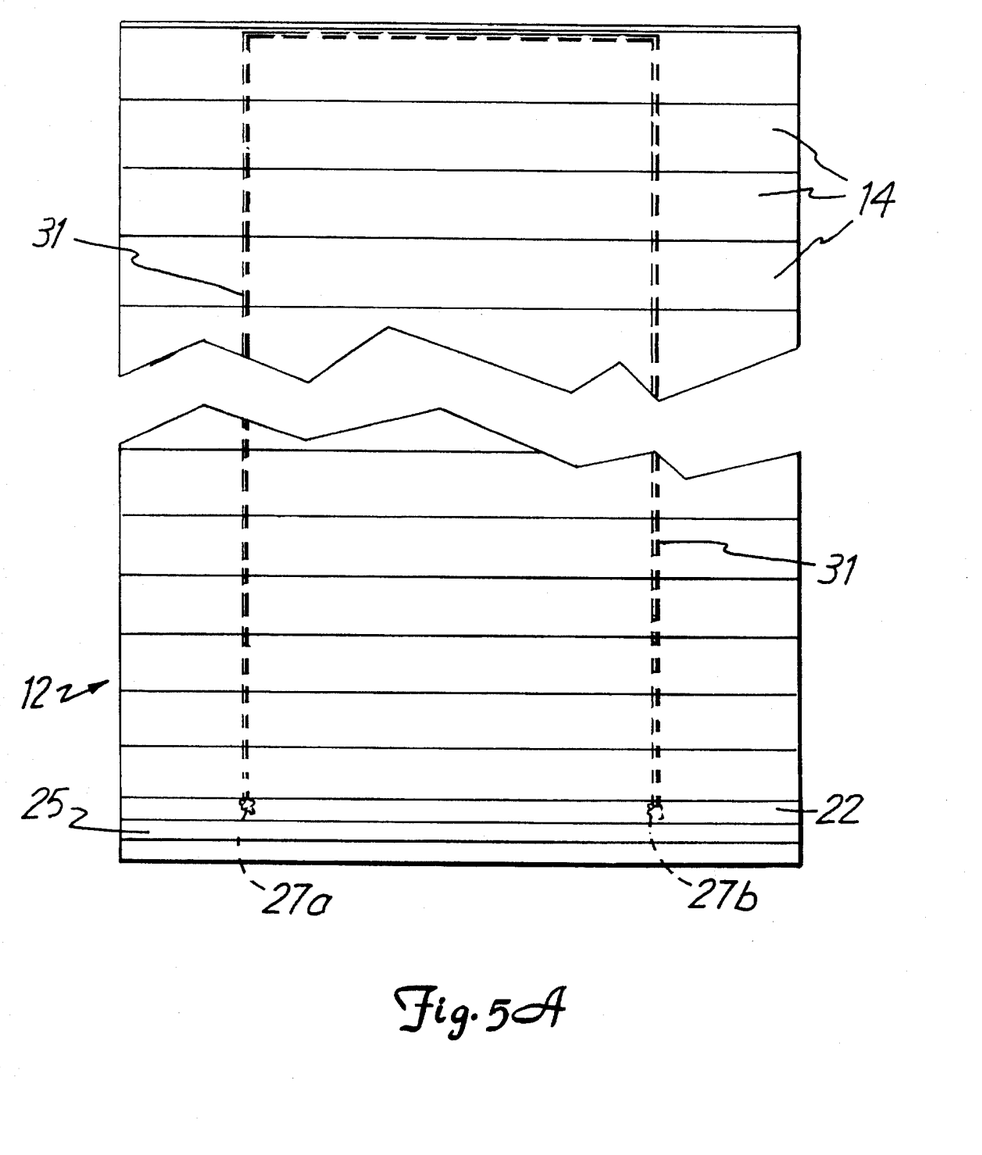
FIGS. 5A shows the exterior surface of an articulated door which is held together by a single segment of elastic shock cord.

FIG. 5A shows an articulated door 12 removed from beverage body 10 of FIG. 1. In this Figure, the door is shown as if it were laid on a flat surface, with the exterior of the door facing up.

In this configuration, articulated door 12 is held together by a single segment of elastic shock cord 31, which is shown in phantom in FIG. 5A. Shock cord 31 is a commercially available elastic shock cord having a diameter of slightly less than one-eight of an inch. Shock cord 31 is secured to bottom aluminum panel section 22 by knot 27a. The placement of knot 27a within bottom aluminum panel section 22 is shown as knot 27 in FIG. 2B.

Shock cord segment 31 runs from knot 27a, up through all panel sections 14, then loops across the top panel section, and down through all panel section 14 to knot 27b. The portions of shock cord segment 31 which comprise knots 27a and 27b apply an upward force to bottom aluminum panel section 22, while the portion of segment 31 which runs along the top panel section of door 12 applies a downward force to the top panel section. Accordingly, a single segment of shock cord is used to hold door 12 together.

The distance between knots 27a and 27b is approximately 23 inches. It has been found that a proper amount of tension in shock cord 31 is achieved when a segment of loose shock cord is cut to a length equal to twice the height of door 12, then stretched by about 25 inches when the door is assembled. For example, assume a worker is assembling a door that is 87 inches tall and 54 inches wide. The worker will cut a piece of loose shock cord that is 174 inches long. This piece can easily be measured by laying the cord up and down along the length of door to be assembled. When the shock cord is inserted into the door, it will be stretched about 25 inches due to knots 27a and 27b and the portion which runs along the top panel section.

For assembly reasons, it is preferable to have the two knots 27a and 27b at the bottom aluminum panel section 22. However, in another configuration the two knots are at the top panel section, with the shock cord looping back across bottom aluminum panel section 22.

Figure 5B:
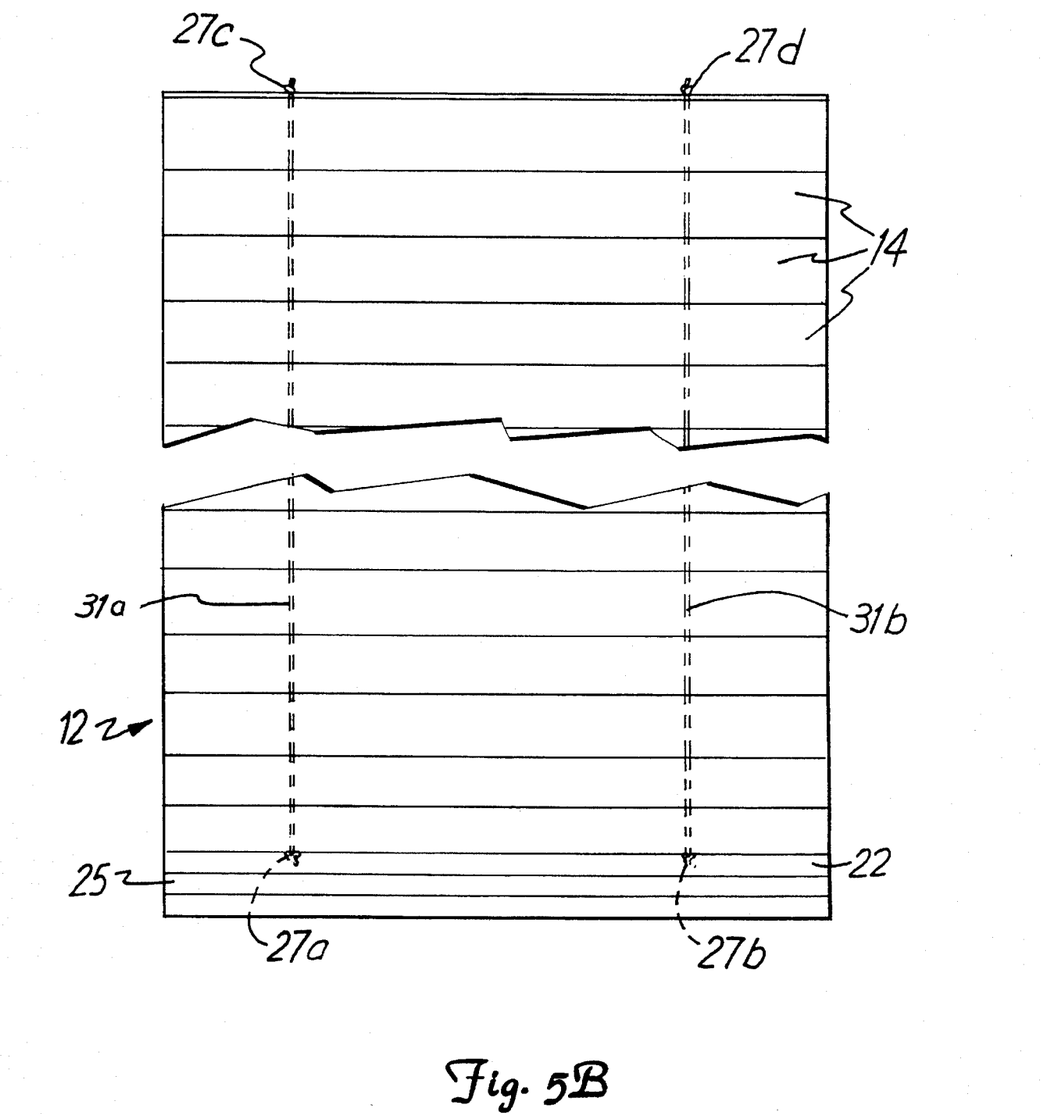
FIG. 5B shows the exterior surface of an articulated door which is held together by two segments of elastic shock cord.

FIG. 5B shows an alternate method for holding door 12 together with shock cord. In FIG. 5B, door 12 is provided with shock cord segments 31a and 31b, both of which are shown in phantom. As in FIG. 5A, knot 27a and 27b hold the shock cord to bottom aluminum panel section 22. However, shock cord segment 31a has a knot 27c which holds segment 31a to the top panel section 14 of door 12. Likewise, shock cord segment 31b has a knot 27d which holds it to the top panel section 14.

For assembly reasons, the configuration shown in FIG. 5B is not utilized when door 12 is initially assembled. However, if a door 12 should become damaged and any of the panel sections 14 need to be replaced, and if that damage occurred near the top of door 12, then the segment of shock cord 31 at the top of door 12 in FIG. 5A can be cut, and the damaged panel section can easily be removed. Once the panel section is removed, then the two segments 31a and 31b which were formed when segment 31 of FIG. 5A was cut can be tied off separately using knots 27c and 27d in FIG. 5B to form the configuration shown in FIG. 5B.

Another method of repairing the door shown in FIG. 5A would be to simply tie the two segments together after they have been cut and the door has been repaired. However, depending on the tension already existing in the shock cord, this alternative may not be feasible.

Figure 6A:
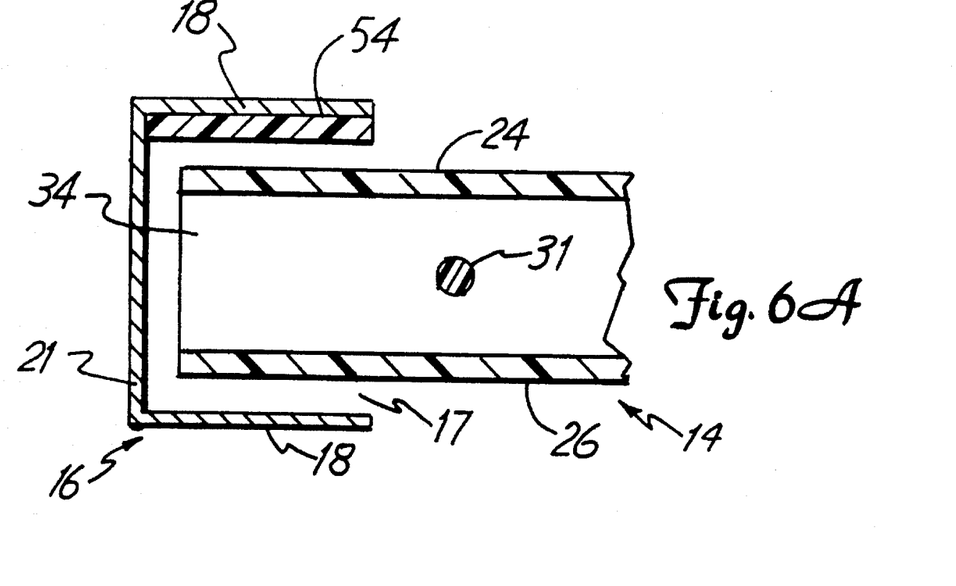
FIGS. 6A and 6B are top cutaway views taken along line 6A—6A and 6B—6B, respectively, of FIG. 1 showing panel sections inserted into door guiding tracks.

FIG. 6A is a fragmentary cutaway view showing panel section 14 and door guiding track 16 taken along line 6A—6A of FIG. 1. Door guiding track 16 includes a pair of channels 21, one of which is shown in this figure. Channel 21 includes channel members 18 facing each other across gap space 17. The distance between curved inner surface 24 and flat outer surface 26, i.e., the width of panel section 14, is preferably 0.515 inches.

In this embodiment, track liner 54 is positioned over a channel member 18 that faces curved inner surface 24 of panel section 14. Track liner 54 is formed from a high density ultra-high molecular weight polyethylene plastic. This produces a sliding, self-lubricating, plastic-on-plastic contact between polymeric panel section 14 and track liner 54. This embodiment is used in door guiding tracks that have been converted to the present invention from door guiding tracks of the prior art.

Figure 6B:
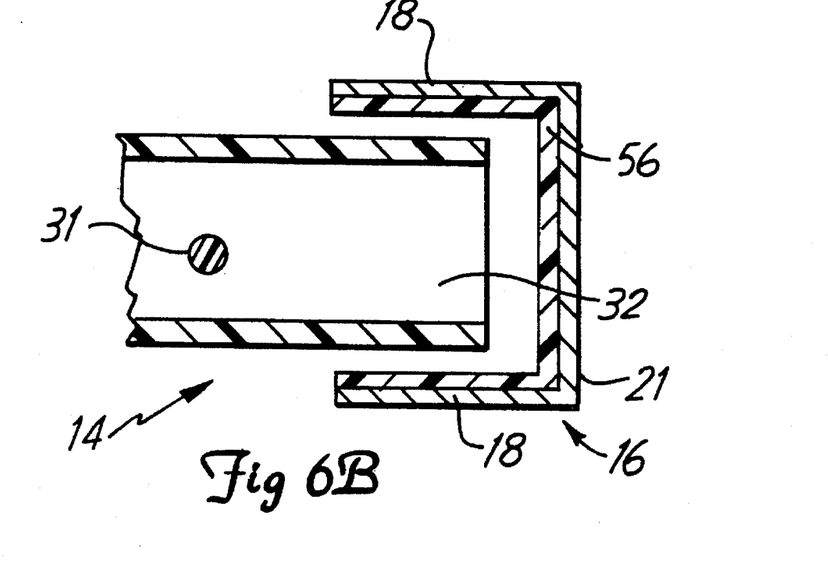

FIG. 6B is a fragmentary cutaway view showing panel section 14 and door guiding track 16 taken along line 6B—6B of FIG. 1. Right end 32 is positioned in gap space 17 of channel 21. In this embodiment, a three-sided integrally formed track liner 56 is placed in channel 21. Track liner 56 is formed from a high density ultra-high molecular weight polyethylene plastic. This produces a sliding, self-lubricating, plastic-on-plastic contact between polymeric panel section 14 and track liner 56. This embodiment is used in door guiding track of new construction.

The present invention improves the operation of articulated doors and door guiding tracks in beverage bodies by eliminating the rollers required in the prior art. The rollers are replaced by a sliding, self-lubricating, plastic-on-plastic contact that supports and guides the articulated door as it is moved between the open position and the closed position, thereby making the door less sensitive to door frame misalignment. The door is held together by the hinges formed between adjacent panel sections and by the elastic shock cord that runs from the bottom panel section to the top panel section in each door. The shock cord prevents adjacent panel sections from moving laterally with respect to one another and holds the flat outer surface of each panel section flush with the flat outer surfaces of adjacent panel sections.

The articulated door of the present invention will last longer than articulated aluminum doors of the prior art. The plastic-on-plastic contact in the hinges that connect adjacent panel sections can outwear the aluminum-on-aluminum contact in the hinges of the prior art by a factor of approximately 6 to 1. Although both plastic and aluminum can be steam cleaned, any salt, sand, or dirt that gets into an aluminum hinge will take a toll in wear and corrosion before it can be removed. In contrast, when a plastic hinge is steam cleaned and the salt, sand and dirt are removed, the underlying plastic surfaces of the hinge are left largely unaffected because the plastic used in the present invention is highly corrosion resistant and wear resistant.

The articulated door of the present invention weighs less than one-half the weight of articulated aluminum doors of the prior art. This results in a weight reduction of more than 500 pounds in a typical beverage body. In addition, because of the door's light weight, the counterbalance used in articulated aluminum doors of the prior art may not be needed, further decreasing the cost and weight of the beverage body.

Compared to aluminum, which is highly thermo-conductive, the plastic used to form the articulated door of the present invention has a very high insulation value. While an articulated aluminum door of the prior art will require a layer of insulation to be attached for use in cold climates, the articulated door of the present invention will not require additional insulation.

The articulated door of the present invention is resilient; articulated aluminum doors of the prior art are not. The door is much less likely to be damaged from impacts and collisions than are aluminum doors of the prior art. If the door is impacted, the panel sections probably will not break, but instead may pop out of the door guiding track and the hinges that connect the panel sections to adjacent panel sections. Most likely the panel sections will not be damaged and the door can be reassembled.

Although the present invention has been described with reference to preferred embodiments, workers skilled in the an will recognize that changes may be made in form and detail without departing from the spirit and scope of the invention.

What is claimed is:

1. An articulated door comprising:

a plurality of panel sections connected together in hinged relation in a sequence of panel sections, adjacent panel sections forming a hinge allowing the adjacent panel sections to be positioned at varying angles with respect to each other; and cord means, coupled to a first panel section and a second panel section of the sequence of panel sections, for applying a compression force between the first panel section of the sequence of panel sections and the second panel section of the sequence of panel sections to urge the adjacent panel sections into contact with each other.

2. The articulated door of claim 1 wherein the cord means is comprised of elastic shock cord.

3. The articulated door of claim 1 wherein the first panel section is a top panel section of the sequence of panel sections and the second panel section is a bottom panel section of the sequence of panel sections.

4. The articulated door of claim 1 wherein the cord means is coupled to the second panel section proximate a left side of the door, passes through every panel section of the sequence of panel sections located between the first and second panel sections, runs along the first panel from a first position proximate the left side of the door to a second position proximate a right side of the door, passes again through every panel section of the sequence of panel sections located between the first and second panel sections, and is coupled to the second panel section proximate the right side of the door.

5. The articulated door of claim 1 wherein the cord means comprises:

a first segment of elastic shock cord having a first end coupled to the first panel section and a second end coupled to the second panel section; and a second segment of elastic shock cord having a first end coupled to the first panel section and a second end coupled to the second panel section.

6. The articulated door of claim 5 wherein the first and second segments of elastic shock cord each pass through every panel section of the sequence of panel sections located between the first and second panel sections.

7. The articulated door of claim 1 wherein each panel section comprises:

a flat outer surface;

a curved inner surface;

a plurality of partitions connecting the outer surface to the inner surface and separating a space between the outer surface and the inner surface into a plurality of compartments;

a bottom receptive edge positioned adjacent to the outer surface and the inner surface and connecting the left end to the right end; and a top hook edge positioned opposite the bottom receptive edge, adjacent to the outer surface and the inner surface and connecting the left end to the right end, for engaging the bottom receptive edge of a like panel section by being generally positioned within the bottom receptive edge of the like panel section to form the hinge between the adjacent panel sections.

8. The articulated door of claim 7 wherein the cord means is located between the flat outer surface and the curved inner surface of every panel section of the sequence of panel sections between the first and second panel sections.

9. The articulated door of claim 1 wherein the plurality of panel sections are formed from plastic.

10. The articulated door of claim 1 wherein at least one panel section is formed from aluminum.

11. The articulated door of claim 1 wherein the plurality of panel sections includes at least one intermittent panel section between the first and second panel sections.

12. A beverage body for transporting beverages, the beverage body comprising:

a floor:

a roof;

a plurality of generally vertical walls intermediate to the floor and the roof and forming an interior of the beverage body;

a plurality of beverage storage bays located in the interior; and a plurality of articulated doors with each door providing access to one of the storage bays, wherein each door is comprised of:

a left channel comprised of a pair of left channel members:

a right channel comprised of a pair of right channel members;

a plurality of panel sections connected together to form a hinge between adjacent panel sections, the hinge allowing the adjacent panel sections to be positioned at varying angles with respect to each other, wherein each panel section includes:

a left end which extends into the left channel; and a right end which extends into the right channel; and cord means, coupled to a first panel section and a second panel section of the plurality of panel sections, for applying a compression force between the first panel section of the plurality of panel sections and the second panel section of the plurality of panel sections to urge the adjacent panel sections into contact with each other.

13. The beverage body of claim 12 wherein the cord means of at least one door is comprised of elastic shock cord.

14. The beverage body of claim 12 wherein the first panel section of a first door of the plurality of doors is a top panel section of the sequence of panel sections and the second panel section of the first door is a bottom panel section of the sequence of panel sections.

15. The beverage body of claim 12 wherein the cord means of the first door is comprised of a segment of elastic shock cord having first and second ends, wherein the first end is coupled to the second panel section proximate a left side of the first door, the segment passes through every panel section of the sequence of panel sections located between the first and second panel sections, the segment runs along the first panel from a first position proximate the left side of the first door to a second position proximate a right side of the first door, the segment passes again through every panel section of the sequence of panel sections located between the first and second panel sections, and the second end is coupled to the second panel section proximate the right side of the first door.

16. The beverage body of claim 12 wherein the cord means of at least one door comprises:

a first segment of elastic shock cord having a first end coupled to the first panel section and a second end coupled to the second panel section; and a second segment of elastic shock cord having a first end coupled to the first panel section and a second end coupled to the second panel section.

17. The beverage body of claim 16 wherein the first and second segments of elastic shock cord each pass through every panel section of the sequence of panel sections located between the first and second panel sections.

18. The beverage body of claim 12 wherein each panel section of a first door of the plurality of doors comprises:

a flat outer surface;

a curved inner surface;

a plurality of partitions connecting the outer surface to the inner surface and separating a space between the outer surface and the inner surface into a plurality of compartments;

a bottom receptive edge positioned adjacent to the outer surface and the inner surface and connecting the left end to the right end; and a top hook edge positioned opposite the bottom receptive edge, adjacent to the outer surface and the inner surface and connecting the left end to the right end, for engaging the bottom receptive edge of a like panel section by being generally positioned within the bottom receptive edge of the like panel section to form the hinge between the adjacent panel sections.

19. The beverage body of claim 18 wherein the cord means of the first door is located between the flat outer surface and the curved inner surface of every panel section of the sequence of panel sections between the first and second panel sections.

20. The beverage body of claim 12 wherein the plurality of panel sections of at least one door are formed from plastic.

21. The beverage body of claim 12 wherein at least one panel section of at least one door is formed from aluminum.

22. The beverage body of claim 12 wherein the plurality of panel sections of each door includes at least one intermittent panel section between the first and second panel sections.

23. An articulated door system for use in a beverage body, the articulated door system comprising:

a left channel comprised of a pair of left channel members:

a right channel comprised of a pair of right channel members;

a plurality of polymeric panel sections connected together to form a hinge between adjacent polymeric panel sections, the hinge allowing the adjacent polymeric panel sections to be positioned at varying angles with respect to each other, the plurality of polymeric panel sections including a top polymeric panel section and a bottom polymeric panel section, wherein each polymeric panel section includes:

a left end that extends into the left channel; and a right end that extends into the right channel; and at least one cord segment, with each cord segment coupled to the top polymeric panel section and the bottom polymeric panel section, and applying a compression force between the top polymeric panel section and the bottom polymeric panel section to urge the adjacent polymeric panel sections into contact with each other.

24. The articulated door system of claim 23 wherein the plurality of panel sections includes at least one intermittent panel section between the first and second panel sections.

* * * * *

UNITED STATES PATENT AND TRADEMARK OFFICE
CERTIFICATE OF CORRECTION

PATENT NO. : 5,547,241
DATED : AUGUST 20, 1996
INVENTOR(S) : PAUL A. VILLELLA, JERRY T. TEIGEN

It is certified that error appears in the above-indentified patent and that said Letters Patent is hereby corrected as shown below:

On the Title Page [56] insert --FOREIGN PATENT DOCUMENTS

| 181,711 | 9/62 | Sweden | |
| 2,507,240 | 9/76 | West Germany | 160/133 |
| 2056 | 3/90 | PCT | 296/98-- |

Col. 7, line 60, delete "an", insert --art--
Col. 8, line 3, delete "an", insert --art--

Signed and Sealed this

Twenty-eighth Day of January, 1997

Attest:

BRUCE LEHMAN

Attesting Officer    Commissioner of Patents and Trademarks